United States Patent
Mojelski

[15] 3,696,653
[45] Oct. 10, 1972

[54] SILL CLAMP FOR AUTOMOBILES

[72] Inventor: William Mojelski, Grand Forks, British Columbia, Canada

[73] Assignee: Mo Clamp Co. Ltd., Delta, B.C., Canada

[22] Filed: June 4, 1970

[21] Appl. No.: 43,336

[52] U.S. Cl. .................72/296, 72/705, 24/248, 72/293, 72/301
[51] Int. Cl. ..................B21d 11/04, B21d 1/14
[58] Field of Search.................72/293, 295–305, 72/308–315, 316, 317; 24/263 LL, 263 PR, 263 LS, 263 SB, 263 B, 263.3, 263.4, 73 BS, 73 SA

[56] References Cited

UNITED STATES PATENTS

| | | | |
|---|---|---|---|
| 2,608,730 | 9/1952 | Killius | 72/705 X |
| 2,433,906 | 1/1948 | Husted | 24/263.4 |
| 3,241,352 | 3/1966 | Lincourt | 72/705 X |
| 3,131,747 | 5/1964 | Junkins | 72/705 X |

Primary Examiner—Richard J. Herbst
Attorney—Brian J. Wood

[57] ABSTRACT

A sill clamp for attachment to a sill of an automobile body, the clamp having a pair of clamping parts connected for relative rocking and slideable movement, and having complementary jaws and lever portions. One of the parts having a cam movable into engagement with a lever portion of the other part for spreading the lever portions apart and moving the jaws together. Means are provided on the parts for attachment of tensioning devices for straightening the automobile body.

4 Claims, 7 Drawing Figures

William Mojelski,
Inventor by Lyle G. Trorey,
Agent

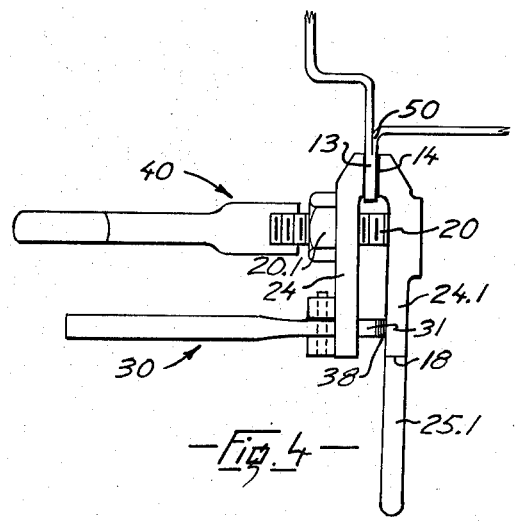
-Fig. 4-
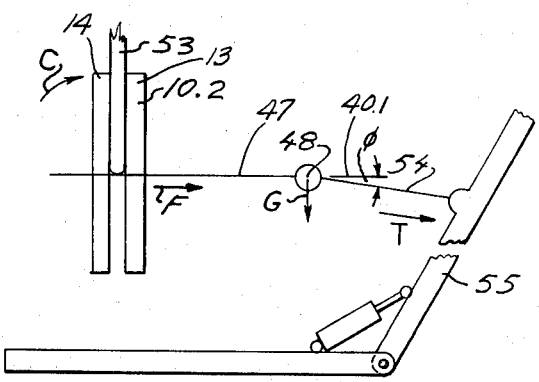
-Fig. 6-
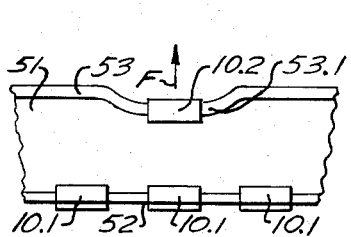
-Fig. 5-
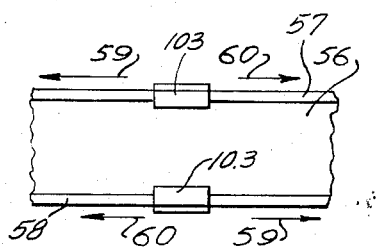
-Fig. 7-
William Vojelsi,
Inventor
by Lyle G. Trorey,
Agent

SILL CLAMP FOR AUTOMOBILES

BACKGROUND OF THE INVENTION

1. Field of the Invention

This invention relates to devices for straightening automobile bodies and in particular to a clamp attachable to an automobile sill.

2. Prior Art

In repairing automobiles it is often necessary, in addition to repairing superficial skin damage, to straighten automobile bodies which have been twisted, bent, or otherwise damaged. Equipment used usually includes clamps and like devices which are fastened to a sill of an automobile body to permit connection of tensioning devices so that the body can be bent back to shape.

Most prior art clamping devices have not proven entirely satisfactory, primarily due to the fact that such devices have a tendency to rotate about the sill when forces are applied by the tensioning devices. Furthermore, prior art clamping devices usually require the use of tightening tools such as spanners or wrenches.

SUMMARY OF THE INVENTION

The present invention provides a clamping device, hereinafter called a sill clamp, for attachment mainly to a sill, or any part of possible attachment, of an automobile. The clamp can be applied easily and quickly, and incorporates means for restraining rotation of the clamping device about the sill.

The sill clamp of the present invention, furthermore, does not require the use of any tools for its application to an automobile body.

The clamp of the present invention includes a pair of clamping parts having parallel clamping jaws and lever portions, means between the jaws and lever portions for adjustably connecting the clamping parts in spaced relationship and for relative rocking movement, cam means on one of the clamping parts engageable with a lever portion of the other clamping part for spearding the lever portions apart so as to move the clamping jaws into clamping engagement with a sill of an automobile, and means on the clamp for attachment of tensioning devices thereto.

DESCRIPTION OF THE DRAWINGS

FIGS. 3 and 4 are end elevations of the sill clamp illustrating application to a sill of an automobile, FIGS. 5, 6, and 7 illustrate, diagrammatically, use of the sill clamp in repairing an automobile.

A detail description following, related to drawings, gives exemplification of preferred embodiment of the invention which, however, is capable of expression in structure other than that particularly described and illustrated.

DETAILED DESCRIPTION

Figure 1:
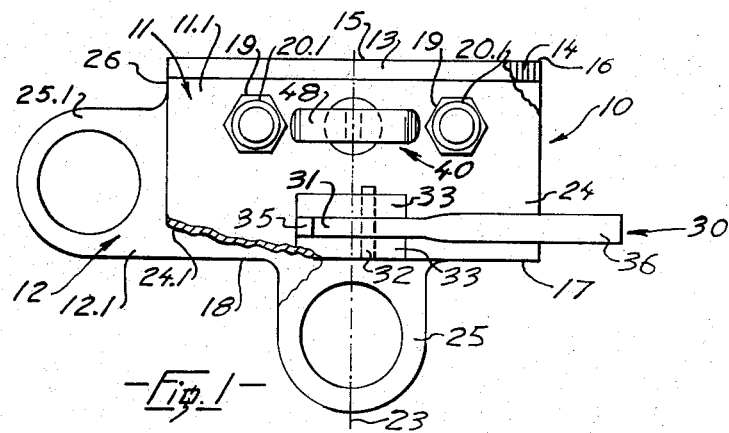
FIG. 1 is a side elevation of a sill clamp of the invention, portions being broken away.
Figure 2:
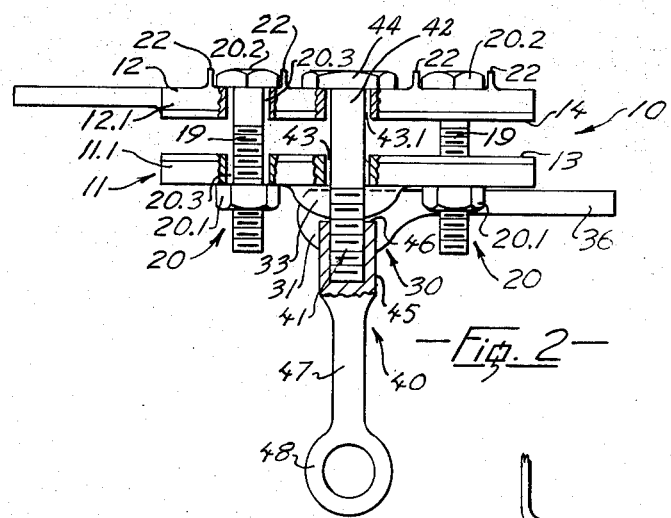
FIG. 2 is a plan view of the sill clamp.
Figure 3:
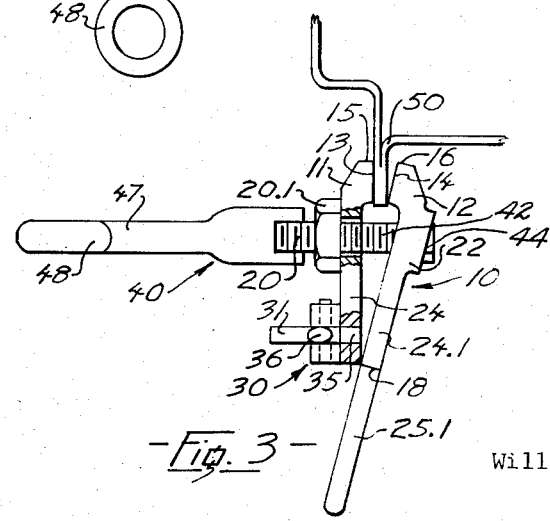

FIGS. 1, 2, and 3

FIGS. 1, 2, and 3 show a sill clamp 10 of the invention, the clamp including a pair of clamping parts 11 and 12. The clamping parts are rectangular plates 11.1 and 12.1 having parallel, and inwardly turned, toothed clamping jaws 13 and 14 extending along side edges 15 and 16 of the plates, the plates having opposite side edges 17 and 18.

The clamping plates, see FIG. 2, are mounted face to face on shanks 19 of a pair of bolts 20 having nuts 20.1 and heads 20.2, the bolts passing through holes 20.3 in both plates. The shanks of the bolts have a clearance, about one eighth inches, in the holes so that the clamping plates can slide and rock on the bolt shanks, see FIGS. 2 and 3. The heads 20.2 of the bolts fit between extending ears 22 on the clamping plate 12.1 which prevent rotation of the bolts when the nuts are turned.

As seen in FIGS. 1 and 2, the bolts are equidistantly spaced apart from, and on opposite sides of, a transverse centerline 23 of the clamp and are closer to the jaws 13 and 14 than to the edges 17 and 18, portions of the plates below the bolts being termed lever portions 24 and 24.1.

The clamping plate 12.1 has loops 25 and 25.1 for attachment of tensioning devices, not shown, the loop 25 extending from the side edge 18 and the loop 25.1 extending from an adjacent side edge 26.

The clamping plate 11.1 has a cam device 30 located on transverse centerline 23 adjacent the side edge 17, the cam device having a lobe portion 31 mounted for rotation on a pin 32 mounted in a bracket 33 located to one side of an opening 35 in the clamping plate 11.1. The cam device has an operating handle 36 for swinging the lobe portion between a non-operative position, as shown in FIG. 3, and an operative position in which the lobe portion extends through the opening against an inner face 38 of the lever portion 24.1.

The sill clamp has a tension and control arm assembly 40 located midway between the bolts 20, see FIG. 2, which assembly includes a bolt 41 having a shank 42. The shank 42 passes through registering holes 43 and 43.1 in the plates 11.1 and 12.1. The bolt 42 has a head 44 bearing against the plate 12.1 and the shank is threaded to engage a threaded socket 45 at one end 46 of a rod 47, the rod having a looped free end 48. Both the rod 47 and the bolt 41 are, typically, solid steel stock having a diameter about one inch and an overall length of about ten inches. The holes 43 and 43.1 each have a diameter a little larger than the bolt shank 42 to permit the plates to rock as below described.

OPERATION

FIGS. 3 and 4

In applying the sill clamp 10 to a sill 50 of an automobile body the nuts 20.1 are backed off sufficiently to permit the clamping jaws 13 and 14 to receive the sill and the lobe portion of the cam is swung to the non-operative position. The nuts 20.1 are then finger tightened against the plate 11.1 to draw the plates into a position as seen in FIG. 3. The cam device is then swung from the non-operative position, see FIG. 3, to the operative position, as seen in FIG. 4, so as to spread the lever portion 24 and 24.1 apart, the plates rocking about the shafts of the bolts 20 to move the jaws into tight gripping engagement with the sill.

The clamp, due to the mechanical advantage gained by the cam device, effects a substantially immovable grip on the sill.

FIGS. 5 and 6

FIGS. 5 and 6 show diagrammatically use of sill clamps in repairing a damaged automobile body 51, having sills 52 and 53, the sill 53 having a damaged portion 53.1.

The automobile body is secured against movement by applying sill clamps 10.1 to the sill 52, suitable anchoring cables, not shown, being used. A sill clamp 10.2 is secured to the bent portion 53.1. The looped end 48 of the rod of clamp 10.2, see FIG. 6, is fastened by a short length of chain 54 to a jack 55, the jack being a conventional type commonly used in automobile body work. The jack is also firmly anchored in a known manner and operated to apply tension to the chain.

Referring to FIG. 6, it is evident that without directional control a force F applied to the clamp below the sill would develop a couple C, resulting in rotation of the clamps about the jaws and an upward bending of the sill.

As the chain 54 is connected to the clamp through the control assembly 40 directional control of the force F applied to the clamp is obtained. The rod 47 of the control arm assembly, due to the spaced relationship of the lever portions of the clamp, extends substantially normal to the clamping plates. The chain 54, therefore, can be connected to the jack 55 so that it slopes downwards and away from the axis 40.1 produced of the rod 47 at an angle $\phi$. A force T applied by the jack through the chain 54 to provide a vector corresponding to the force F longitudinally of the rod also has a vector in the direction of the arrow G. Magnitude of the force G can, of course, be adjusted by adjusting the angle $\phi$ to provide a couple reacting against and balancing the couple C. Thus the inwardly bent sill portion 53.1 can be pulled outward and straightened without upward bending.

FIG. 7

FIG. 7 shows the use of a sill clamp in straightening an automobile body 56, sills 57 and 58 having been displaced longitudinally of each other in directions as shown by an arrow 59. Clamps 10.3 are applied to each of the sills as described. Tensioning devices, such as jacks 55, are secured to the clamps and tension applied in directions as shown by the arrows 60.

I claim:
1. A sill clamp for straightening automobile bodies including:
   a. a pair of clamping parts having clamping jaws and lever portions,
   b. means located between the jaws and lever portions for connecting the clamping parts for relative rocking movement,
   c. cam means on a lever portion of one of the clamping parts operable into and out of engagement with a lever portion of the other clamping part for spreading the lever portions apart so as to pivot the clamping jaws into gripping engagement with a sill of an automobile,
   d. the lever portions having a pair of registering holes,
   e. a control arm having a slidable fit through the registering holes having a head on one end engageable with one of the lever portions and having means at an opposite end spaced from said clamping parts adapted for connection to a tensioning device.

2. A sill clamp as claimed in claim 1 in which the control arm assembly includes a bolt extending through registering holes in the clamping parts and a rod having a threaded socket at one end for threadedly receiving the bolt and an eye at a free end of the rod for connection of the tensioning device.

3. A sill clamp as claimed in claim 1 in which the means for connecting the clamping part for relative rocking movement include bolts having shanks extending through and having a loose fit in registering holes of the clamping parts and nuts threaded on the shanks adapted to be tightened against one of the clamping parts.

4. A sill clamp as claimed in claim 1 in which the cam means includes an opening in the lever portion of one of the parts, a cam lobe portion mounted at the opening fro swinging movement into and out of camming engagement with the lever portion of the other part and a lever connected to cam lobe portion for operating the latter.

* * * * *